INVENTOR
JACOB S. KAMBORIAN
BY Albert Gordon
ATTORNEY

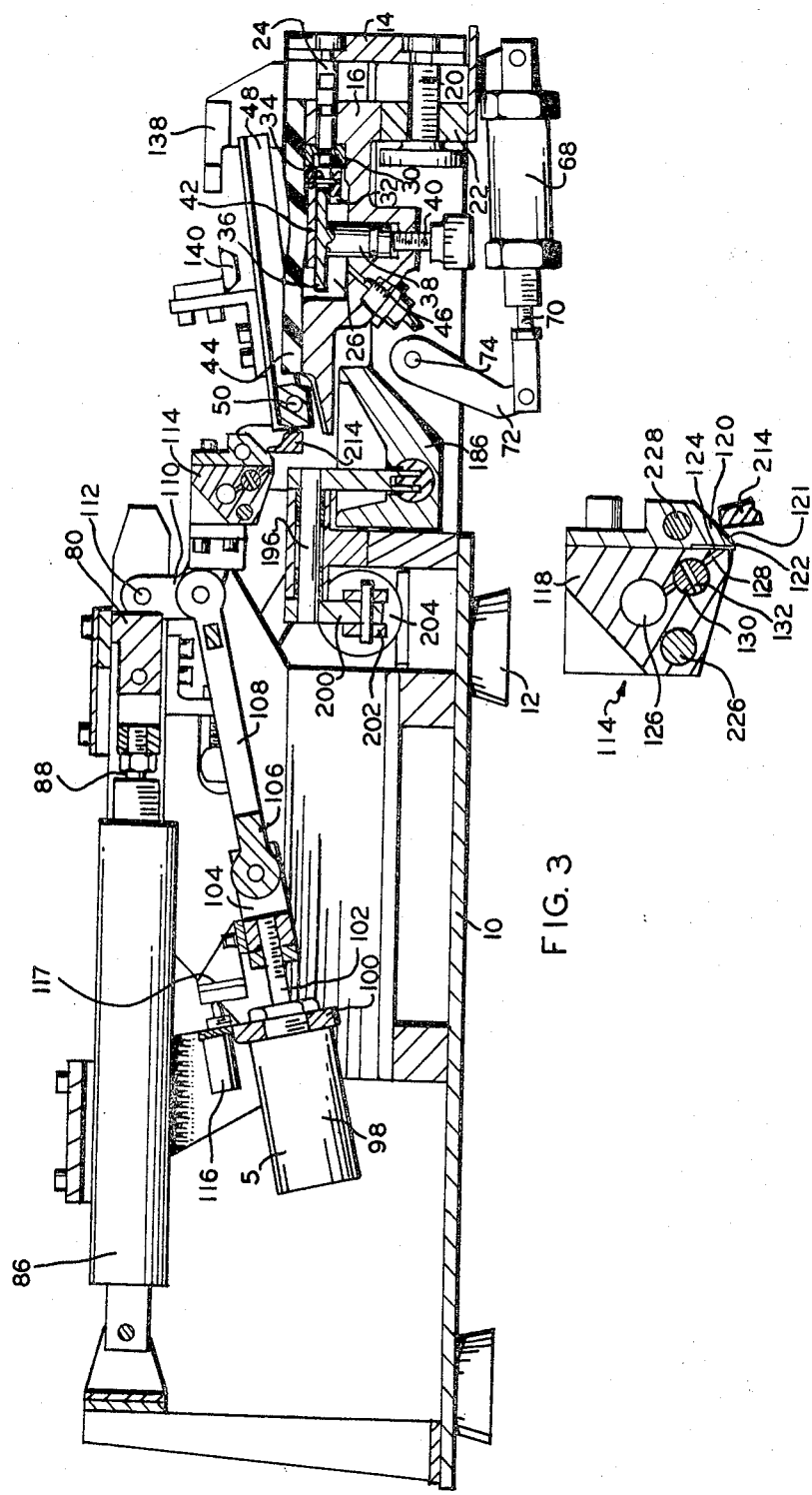

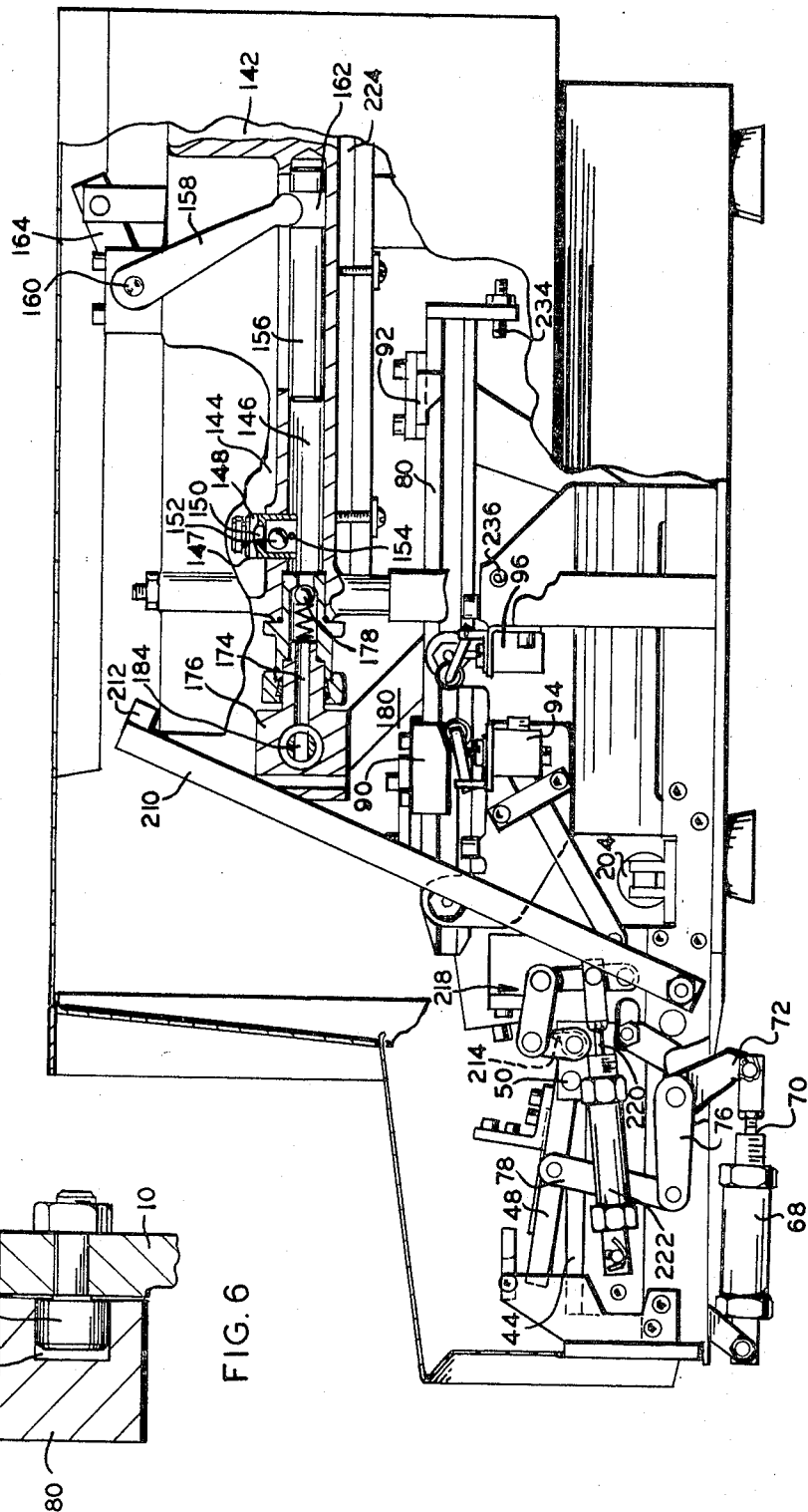

3,523,814
COATING OF A SHOE PART WITH A STIFFENER
Jacob S. Kamborian, 1380 Soldiers Field Road, Boston, Mass. 02135
Filed Aug. 25, 1965, Ser. No. 482,480
Int. Cl. A43b 23/16
U.S. Cl. 117—38     54 Claims

ABSTRACT OF THE DISCLOSURE

There is disclosed herein the coating of a shoe part with a stiffener wherein the shoe part is supported on a support and a mask, having a gap whose periphery corresponds to the contour of at least a part of the stiffener, is caused to overlie the shoe part while an applicator is applied against the mask in the vicinity of the gap and is moved across the mask and gap with the applicator straddling the gap. Coating material in a fluent condition is deposited on the shoe part in the gap in position to be intersected by the applicator during its movement across the mask.

---

This invention is directed to the coating of a shoe part with a stiffener and is an improvement over the invention disclosed in my pending application Ser. No. 366,513, filed May 11, 1964.

It is desirable that certain portions of a shoe upper, particularly the toe and heel end portions of an upper, have a stiffener secured thereto. The stiffener at the toe end is commonly called a box toe, and the illustrative embodiment of the invention discloses an arrangement for coating the toe portion or vamp of the upper with a box toe, although it should be understood that the invention may be practiced to coat any desired portion of the upper with a stiffener.

In accordance with the invention, the shoe part is supported on a support and a mask, having a gap whose periphery corresponds to the contour of at least a part of the stiffener, is caused to overlie the shoe part. An applicator is applied against the mask in the vicinity of the gap and is moved across the mask and gap with the applicator straddling the gap and coating material in a fluent condition is deposited on the shoe prt in the gap in position to be intersected by the applicator during its movement across the mask.

In one aspect of the invention, the support is made of a flexible, deformable material and the applicator is applied against the mask with a downwardly directed force that is maintained during the movement of the applicator across the mask. This results in the segments of the mask bounding the gap that are engaged by the applicator during its movement being forced downwardly against the support to thereby cause the segments of the shoe part located immediately inward of the gap periphery to bulge upwardly of the mask bottom while the applicator scrapes the coating material onto the shoe part within the gap to a thickness determined by the distance between the bottom of the applicator and the top of the shoe part. As a result, the peripheral edges of the stiffener bounding the gap periphery have a minimum thickness to provide the conventionally desired feather edge.

In another aspect of the invention, the support has a concavity in its upper surface beneath the mask gap and the fluent material is progressively deposited on the shoe part in the gap just before the applicator during the movement of the applicator. As a result, the pressure of the depositation of the fluent material causes the shoe part to be forced against the concavity during the movement of the applicator to thereby provide a stiffener whose thickness increases in directions extending inwardly from its periphery.

In another aspect of the invention, the applicator has a downwardly directed edge and a side extending forwardly and upwardly from the edge. The applicator is initially located in an initial lower rear position that is rearward of the support and mask. The applicator is moved forwardly and upwardly from its initial position, is then lowered against the mask in the vicinity of the gap and is then moved rearwardly to its initial position to intersect the fluent material and scrape it onto the shoe part within the gap. A scraper blade is provided that is normally urged against the applicator side so as to scrape off coating material that may have accumulated on the applicator side and is lowered out of the path of the applicator during the rearward movement of the applicator.

In the drawings:

FIG. 3 is a section taken on the line 3—3 of FIG. 2;

FIG. 4 is a section to an enlarged scale of the applicator and scraper blade;

FIG. 5 is a view taken on the line 5—5 of FIG. 2;

FIG. 6 is a detail taken on the line 6—6 of FIG. 2;

In the illustrative embodiment of the invention, there is provided a device that includes a stationary frame 10 that has feet 12 by which it is supported on a base. The operator is intended to stand to the right of the machine as seen in FIGS. 1–3, and a direction extending toward the operator (left to right in FIGS. 1–3) will be designated as forward while a direction extending away from the operator (right to left in FIGS. 1–3) will be designated as rearward.

Figure 7:
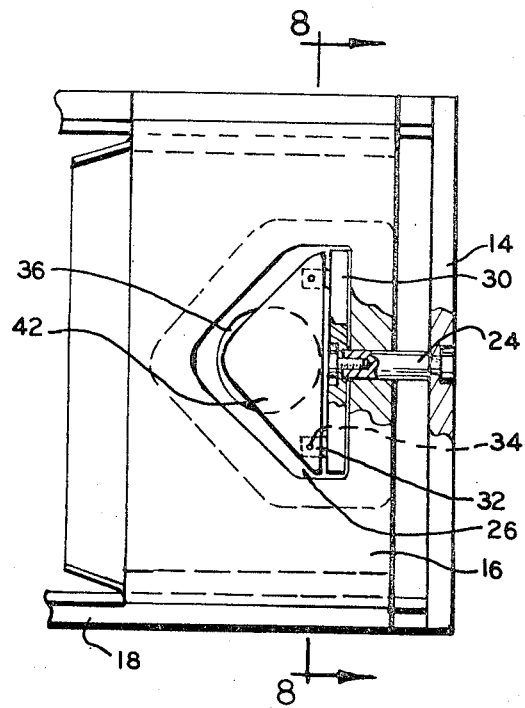
FIG. 7 is a plan view of an arrangement for mounting the support taken on the line 7—7 of FIG. 1.
Figure 8:
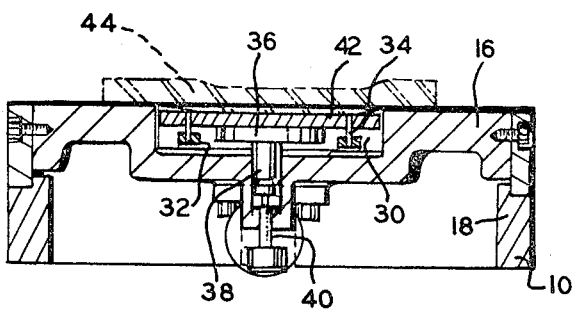
FIG. 8 is a view taken on the line 8—8 of FIG. 7.

The frame 10 has an upright wall 14 at its forward end. A table 16 is slidably mounted for forward and rearward movement in gibs 18 formed in the frame 10 (FIGS. 3, 7 and 8). A screw 20 is threaded into a hanger 22 depending from the table 16 and is rotatably mounted in the wall 14 whereby rotation of the screw will adjust the table forwardly and rearwardly in the frame. A pin 24, extending from the wall 14, is slidable in the table 10, and extends into a cavity 26 in the table. A laterally extending bar 30, that is located at the front of the cavity with its top level with the top of the table and its bottom resting on the bottom of the cavity, is secured to the pin 24. A pair of lugs 32, extending forwardly of the bar 30, have pins 34 upstanding therefrom. A base 36, located in the cavity 26, has a downwardly depending boss 38 that is slidable in an aperture in the table 16 that intersects the bottom of the cavity. The boss 38 rests on a screw 40 that is threaded into the table, whereby the vertical position of the base 36 may be adjusted by rotating the screw 40. A plate 42 is slidably mounted on the pins 34 and rests on the base 36 with the top of the plate below the top of the table 16. A support 44 overlies the cavity 26 and is cemented to the top of the table 16. The support 44 is made of a flexible, deformable material such as rubber, and is forced downwardly into the cavity 26 against the plate 42 to form a concavity in its upper surface by a suction force forcing air from the cavity by way of a port 46 that is in communication with a vacuum pump (not shown).

Figure 12:
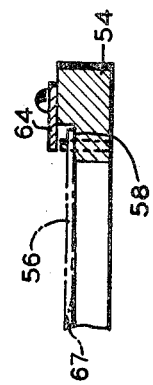
FIG. 12 is a view taken on the line 12—12 of FIG. 10.
Figure 10:
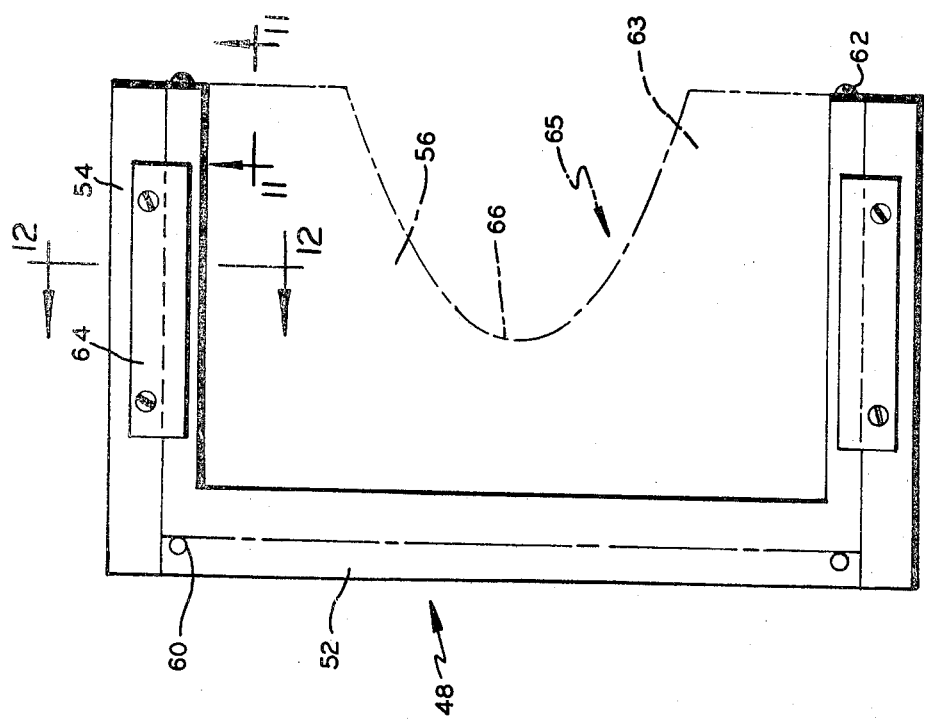
FIG. 10 is a plan view of a mask holder.

Referring to FIGS. 3 and 10–12, a mask holder 48 is pivoted to the frame 10 by pins 50 for swinging movement toward and away from the support 44. The holder 48 includes a transverse leg 52 and a pair of forwardly extending, spaced, parallel legs 54. A mask 56, made of spring steel, extends between the legs 54 and rests on ledges 58 on these legs. The mask is constrained against forward and rearward movement on the holder 48 and by pins 60 upstanding from the leg 52 and the heads of screws 62 that are threaded into the fronts of the legs 54. Bars 64, secured to the legs 54 and overlying the ledges 58, permit a limited degree of upward movement of the mask while constraining the mask against moving upwardly out of the holder 48. The front of the mask has a pair of spaced flanges 63 that define a reentrant portion 66 so arranged that the front of the mask is outwardly of, but adjacent to, the periphery of the cavity 26 and forms a gap 65. The periphery of the cavity 26 has a shape complementary to that of the reentrant portion 66. The bottom of the edge of the mask at the reentrant portion 66 is sloped downwardly and outwardly to form a bevel 67 as indicated in FIG. 12.

Figure 1:
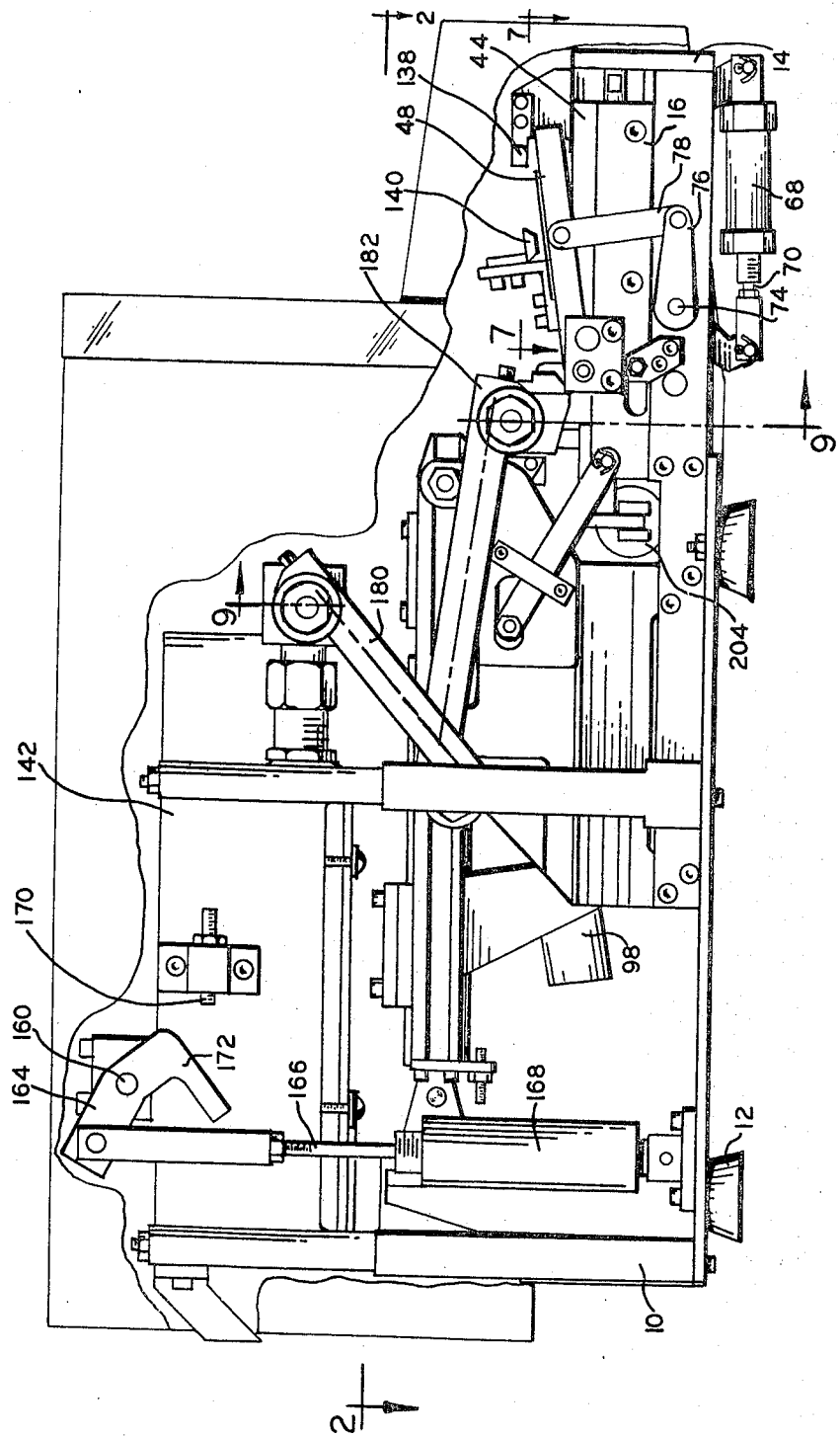
FIG. 1 is a side elevation of an apparatus used in practicing the invention.
Figure 2:
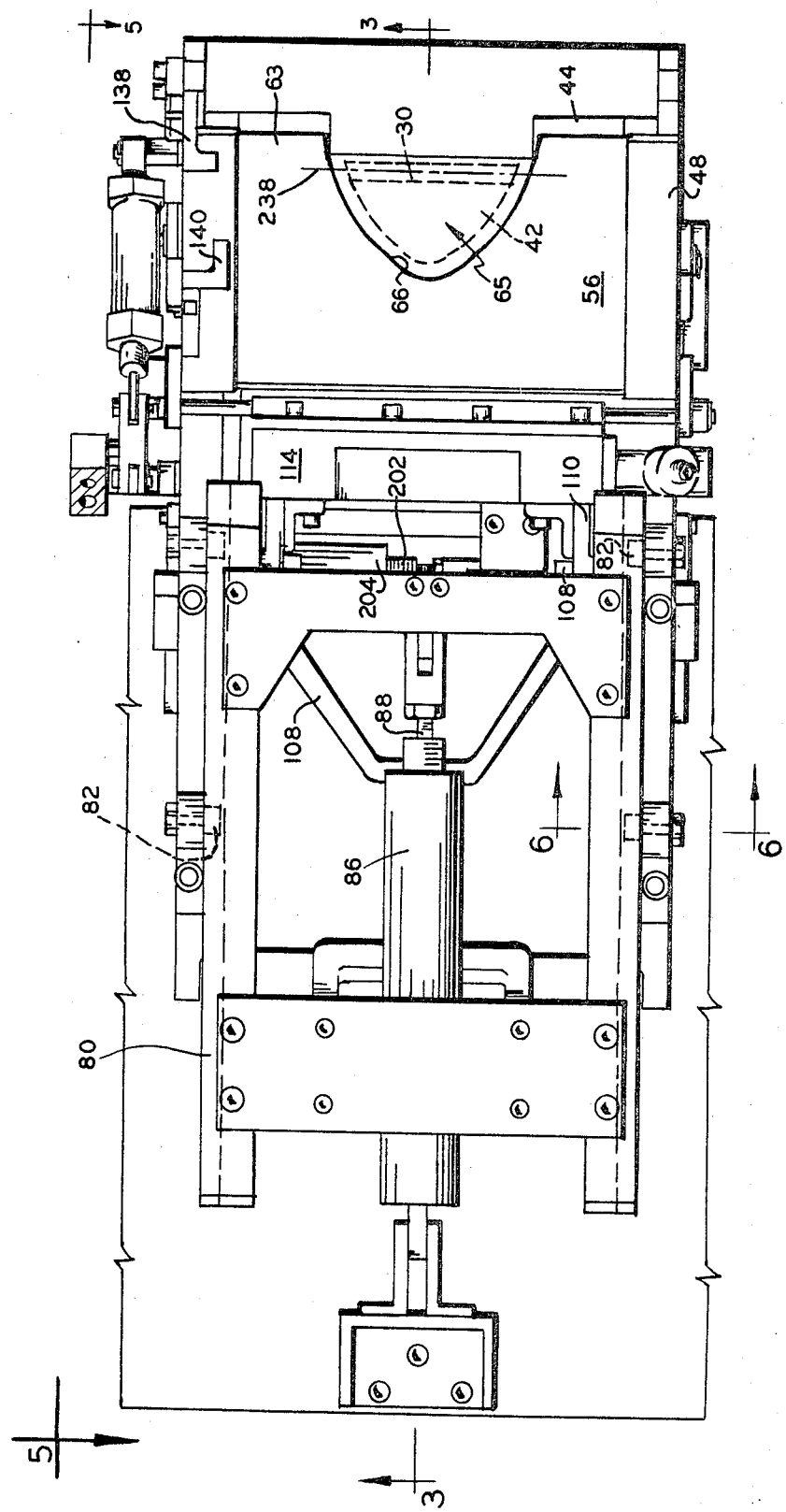
FIG. 2 is a plan view taken on the line 2—2 of FIG. 1.

Referring to FIGS. 1, 3, and 5, an air actuated motor 68 is pivoted to the frame. The piston rod 70 of the motor 68 is pivoted to a link 72 that is secured to a transverse rod 74 which is rotatably mounted in the frame. Links 76 are secured to the opposite ends of the rod 74. The links 76 are each pivoted to a link 78, and each of the links 78 are pivoted to a holder leg 54. Thus, rearward movement of the piston rod 70 acts to lower the mask 56 against the support 44 and forward movement of the piston rod acts to raise the mask.

Rearwardly of the table 44, a carriage 80 is movably mounted in the frame 10 for forward and rearward movement by means of rollers 82 that are secured to the frame and received in grooves 84 in the carriage (see FIGS. 2 and 6). An air actuated motor 86, that is pivoted to the frame 10, has a piston rod 88 that is secured to the carriage 80, thereby enabling this motor to move the carriage forwardly and rearwardly. As shown in FIG. 5, a pair of cams 90 and 92, secured to the carriage, are respectively in alignment with valves 94 and 96 that are secured to the frame.

As shown in FIG. 3, an air actuated motor 98 is secured to a hanger 100 on the carriage 80. The piston rod 102 of the motor 100 is secured to a clevis 104, and the clevis is pivoted to a link 106. The link 106 has a pair of forwardly divergent branches 108 (FIG. 2), and each branch 108 is pivoted to the midportion of a link 110. Each link 110 is pivoted at its top to the carriage 80 by a pin 112. An applicator 114 is secured to and extends between the links 110. A valve 116, mounted on the hanger 100, is in alignment with a cam 117 secured to the clevis 104.

Figure 9:
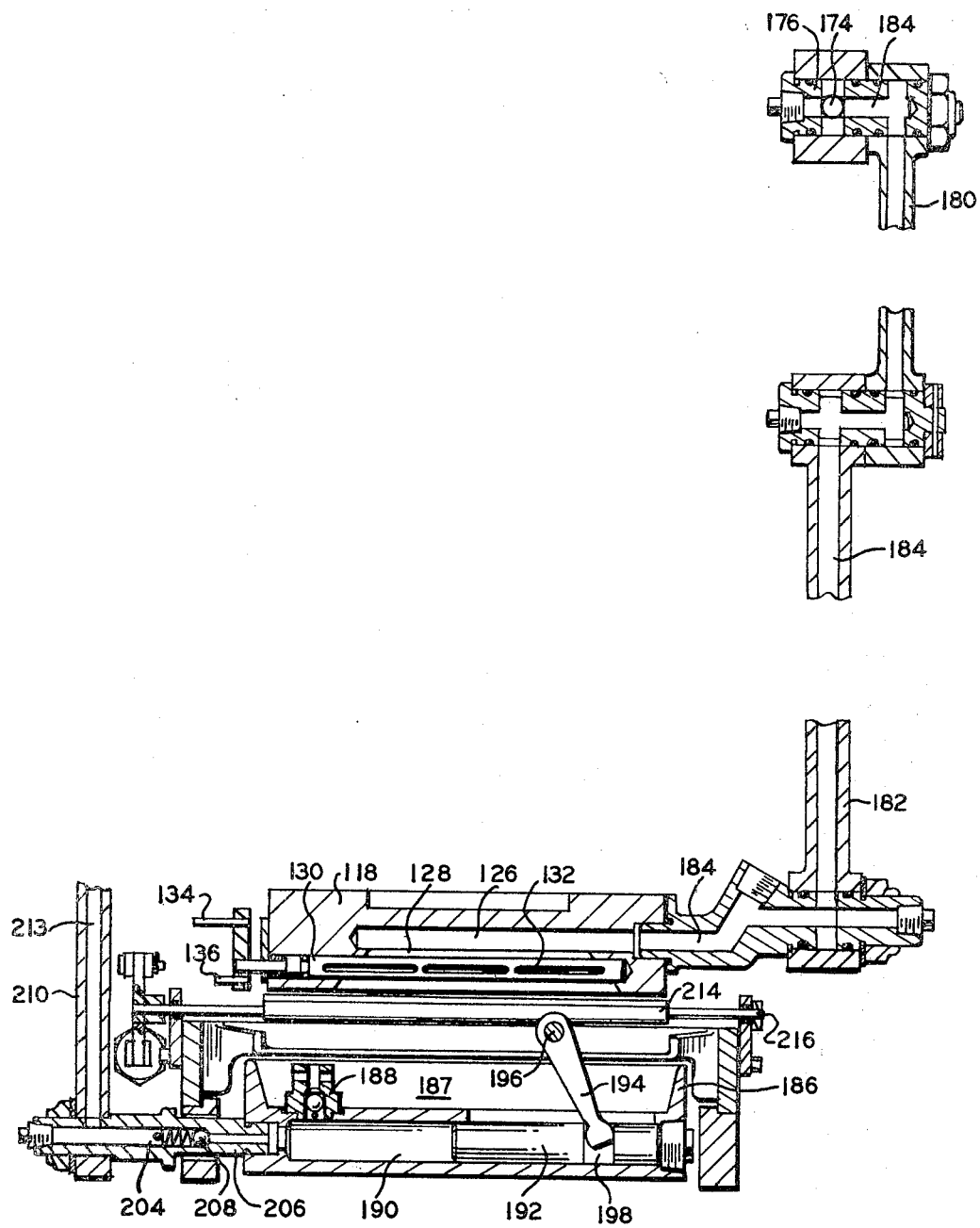
FIG. 9 is a view taken on the line 9—9 of FIG. 1.
Figure 11:
FIG. 11 is a view taken on the line 11—11 of FIG. 10.

Referring to FIGS. 4 and 9, the applicator 114 includes a body 118 having a blade 120 bolted thereto at its forward end. The applicator blade has a downwardly and rearwardly sloped side 121 that terminates in a sharp edge 122. The edge 122 extends below the body 118 and is separated therefrom by a space 124. An aperture 126 in the body 118 is in communication with the space 124 by way of a passage 128. A valve 130, rotatably mounted in the body 118 to intersect the passage 128, has a plurality of diagonal slots 132 extending therethrough, whereby the valve may selectively block or unblock the passage 128 depending on whether the slots 132 are in registry with the passage 128. A pair of pins 134 and 136 (FIG. 9), mounted on an end of the valve 130, are respectively cooperative with cams 138 and 140 (FIGS. 1, 2 and 3) to rotate the valve 130 in the manner described below. The cam 138 is secured to the frame 10 and the cam 140 is secured to the holder 48.

A pot 142, for storing molten coating material, is located in the frame 10 above the carriage 80 (see FIGS. 1 and 5). The pot incorporates a well 144, and a bore 146 is located below the floor of the well. A valve 147 provides communication between the well 144 and the bore 146. The valve 147 includes a bushing 148 having a port 150 therein. A ball 152, seated on a pin 154, normally permits the flow of coating material through the port 150 but may move into blocking relation with respect to the port 150 in response to the application of pressure in the bore 146. This pressure is applied by a plunger 156 that is slidably mounted in the bore and reciprocable in the bore by means of an arm 158 that is secured to a pin 160 and that extends into a recess 162 in the plunger. The pin 160 is rotatably mounted in the frame 10 and is connected to a link 164 that is pivoted to the piston rod 166 of an air operated motor 168 mounted in the frame 10. Thus downward and upward movements of the pison rod 166 will respectively cause forward and rearward movements (FIG. 5) of the plunger 156. A screw 170 threaded into the pot 142 acts to engage a lip 172 on the link 164 and thus limit the extent to which the motor 168 can move the plunger 156 forwardly. The forward end of the bar 146 is in communication with a hole 174 in an adapter 176 that is secured to the pot 142, the hole normally being closed by a spring-pressed ball 178. Referring to FIGS. 1, 5 and 9, a link 180 is pivoted to the adapter 176, a link 182 is pivoted to the body 118 and the links 180 and 182 are pivoted to each other. A conduit 184 extending through the links and their pivotal mountings provides communication between the hole 174 and the aperture 126.

A trough 186 (FIGS. 3 and 9) is provided in the frame 10 below the rear end of the table 16 and mask 56. The trough has a well 187 therein. A valve 188, similar to the valve 147, provides communication between the bottom of the well and the bore 190 located below the well bottom. A plunger 192 is reciprocable in the bore 190 by means of an arm 194 that is secured to a pin 196 and that extends into a recess 198 in the plunger. The pin 196 is rotatably mounted in the frame 10 and is connected to a link 200 that is pivoted to the piston rod 202 of an air operated motor 204 (see FIG. 2). The left end of the bore 190 (FIG. 9) is in communication with a hole 204 in an adapter 206 that is secured to the trough 186, the hole being normally closed by a spring-pressed ball 208. As shown in FIGS. 5 and 9, a link 210 is pivoted to the adapter 206 and extends upwardly thereof with a lip 212 at the top of the link overhanging the well 144. A conduit 213 extends through the link 210 including the lip 212.

As shown in FIGS. 3 and 9, a scraper blade 214 is secured to a shaft 216 that is rotatably mounted in the frame 10. The scraper blade is located below the applicator 114 in a position to engage the side 121 of the applicator blade 120 in the manner described below. The shaft 216 is connected by linkage 218 (FIG. 5) to the piston rod 220 on an air actuated motor 222 whereby the actuation of this motor causes swinging of the scraper blade 214 about the axis of the shaft 216.

In the idle condition of the machine the piston rod 70 is projected out of the motor 68 to maintain the mask 56 in an elevated position, the piston rod 88 is retracted into the motor 86 to maintain the carriage 80 in its rearward position, the piston rod 102 is retracted into the motor 98 to maintain the applicator 114 in a lowered position, the piston rod 166 is retracted into the motor 168 so that the plunger 156 is in a forward position, the motor 204 is in such condition that the plunger 192 is in the FIG. 9 position, the piston rod 220 is projected from the motor 222 so that the scraper blade is yieldably urged by the pressurized air in the motor 222 against the side 121 of the applicator blade 120 as indicated in FIG. 4 and the passage 128 is blocked by the valve 130 as indicated in FIG. 4.

Thermoplastic coating material, that is solid at ambient temperature, becomes molten when heated above a predetermined temperature and reverts to its solid condition when cooled below the predetermined temperature, is placed in the well 144 wherein the coating material is melted by a strip heater 224 (FIG. 5). This material may have a composition such as that disclosed in pending application Ser. No. 440,088, filed Mar. 16, 1965. The material gravitates through the valve 147 and into the bore 146 where it is blocked by the ball 178. The machine is now caused to run through a plurality of cycles, as described below, to cause the plunger 156 to reciprocate and force the coating material past the ball 178, the hole 174, the conduit 184 and the aperture 126 and into the passage 128 where it is blocked by the valve 130. The coating material is maintained molten during this travel by suitably located heating elements such as the heating elements 226 and 228 shown in FIG. 4.

The machine incorporates a suitable control circuit (not shown) to operate the motors of the machine in the sequence set forth below.

Figure 13:
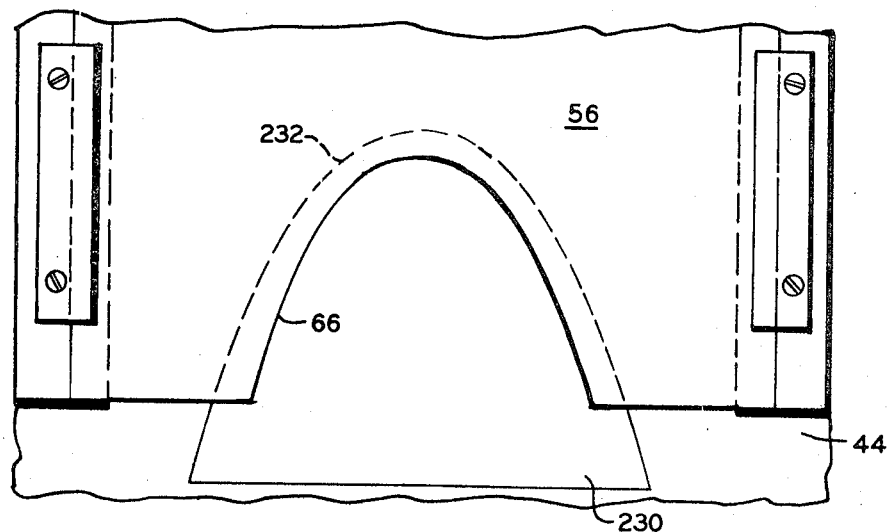
FIG. 13 is a representation of a shoe vamp located between the support and mask.

At the beginning of the operating cycle, the operator presents a shoe vamp 230 on the flexible support 44 with the interior of the vamp facing upwardly in such a manner that the periphery 232 of the vamp projects outwardly and rearwardly of the reentrant portion 66 of the mask 56 (see FIG. 13).

The operator now shifts a starting valve to simultaneously admit pressurized air to the motor 86 to move the carriage 80 forwardly and to the motor 98 to raise the applicator 114 so that the applicator moves upwardly and forwardly from its idle position shown in FIG. 3. During this movement of the applicator, the scraper blade 214, by virtue of its being yieldably urged against the applicator blade side 121 by the motor 222, acts to scrape off any coating material that may have accumulated on the applicator blade side 121 during a preceding machine cycle. The carriage 80 continues with its forward movement until a stud 234 on the carriage engages a stop member 236 on the frame 10 (FIG. 5).

The shifting of the starting valve by the operator also admits pressurized air to the motor 168 in a direction to move the plunger 156 rearwardly to the FIG. 5 position.

Shortly after the actuation of the motors 86 and 98 to raise the applicator 114 and move it forwardly, the motor 68 is actuated to lower the mask 56 and clamp the vamp 230 between the mask and the support 44 and the motor 204 is actuated to move the plunger 192 to the left (FIG. 9).

In the preceding machine cycles, as described below, surplus coating material had been scraped by the applicator 114 into the well 187 and the coating material had flowed from the well 187, through the valve 188 into the bore 190. The leftward movement of the plunger 192 causes the valve 188 to close, similarly to the closure of the valve 147 described below, and forces the coating material in the bore 190 past the ball 208 and through the conduit 213 into the well 144.

At the end of the forward travel of the carriage 80, the valve 96 is closed by the cam 92 which causes the control circuit to supply pressurized air to the motor 98 in a direction to lower the applicator 144 against the mask flanges 63 above the anvil bar 30 under the yieldable, resilient force afforded by the motor 98.

Figure 14:
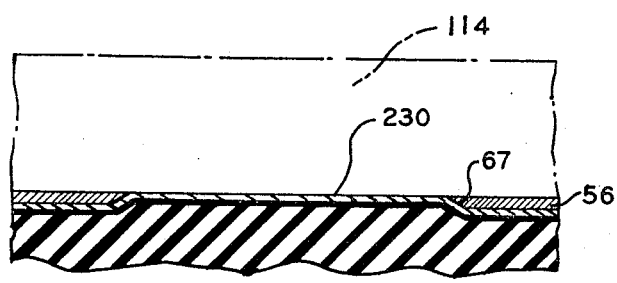
FIG. 14 is a representation of the support, vamp and applicator at the beginning of the rearward movement of the applicator across the mask.

In the lowered position of the applicator, the applicator blade edge 122 straddles the reentrant portion 66 of the mask 56 along the line 238 of FIG. 2. Due to the resilient nature of the material out of which the support 44 is fashioned, and the loose mounting of the mask 56 in the mask holder 48, the applicator blade edge 122 forces the mask downwardly so that the support 44 is compressed beneath the mask and bulges upwardly into the gap 65 formed by the reentrant portion 66, as indicated in FIG. 14, with the upper level of the vamp 230 substantially coextensive with the upper level of the mask. The bevel 67 on the mask permits the vamp portion within the reentrant portion 66 to slope smoothly upwardly with a minimum of space between the vamp and the mask.

During the lowering of the applicator 122 the pin 134 is engaged by the cam 138 to thereby rotate the valve 130 approximately 90 degrees to bring the slots 132 into alignment with the passage 128. The lowering of the applicator 122 also causes the cam 117 to actuate the valve 116. The actuation of the valve 116 causes pressurized air to flow to the motor 86 in a direction to move the carriage 80 and applicator 114 rearwardly to their initial positions, causes pressurized air to flow to the motor 168 in a direction to move the plunger 156 leftwardly (FIG. 5) and causes pressurized air to enter the motor 222 in a direction to swing the scraper blade 214 clockwise (FIG. 3) downwardly out of the path of the applicator blade.

Figure 15:
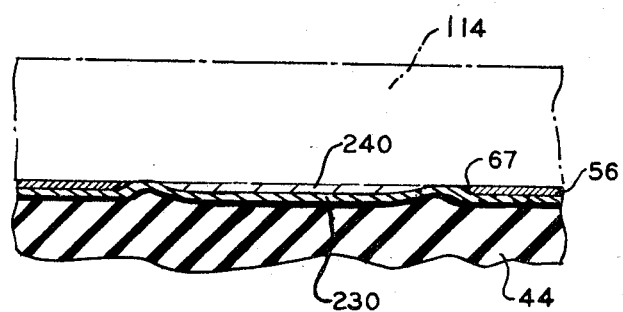
FIG. 15 is a representation of the support, vamp and applicator after the applicator has begun its rearward movement across the mask.

The leftward movement of the plunger 156 causes the ball 152 to move upwardly against the port 150 to close the valve 147 and causes the coating material in the conduit 184 to flow through the slots 132 of the valve 130 and through the space 124 (FIG 4) of the applicator 114 onto the upper surface of the vamp 230 that lies within the gap 65 during the rearward movement of the applicator across the mask. As the applicator moves across the mask under the yieldable force afforded by the motor 98, the portions of the vamp 230 contiguous to the beveled edges of the mask 56 are progressively caused to bulge upwardly as indicated in FIG. 15. As aforesaid, the portion of the support 44 above the plate 42 is forced downwardly against the plate to form a concavity in its upper surface by a suction force entering the cavity through the port 46. During the travel of the applicator above this portion of the support the vamp is forced downwardly against this concavity by the pressure of the fluid coating material 240 emanating from the space 124 of the applicator and bearing against the vamp (FIG. 15). This effect is enhanced by the proximity of the space 124 to the applicator's edge 122. The edge 122 during the rearward travel of the applicator acts as a scraping edge to scrape the coating material across the upper surface of the mask 56 and cause the coating material to adhere to the vamp 230 that is located between the line 238 and the reentrant portion 66 of the mask to a thickness and contour that corresponds to the distance between the upper surface of the vamp and the applicator edge 122. The surplus coating material gathered by the applicator in its rearward movement across the mask is deposited into the trough 186.

The return of the carriage 80 to its rearward position causes the cam 90 to shift the valve 94. The shifting of the valve 94 causes pressurized air to be admitted to the motors 222, 68 and 204 to respectively return the scraper blade 214, mask 48 and plunger 192 to their idle conditions. During the rearward movement of the applicator blade 114, the pin 136 is engaged and swung 90 degrees by the cam 140 to thereby cause the valve 130 to swing to the position shown in FIG. 4, to thus terminate the flow of coating material through the applicator 114 onto the vamp 230 and mask 56.

The operator may now remove the vamp 230 from the machine with the coating material adhered thereto. The coating material is still in fluent condition when the mask 56 is raised and does not adhere to any significant degree to the mask due to the fact that there is residual heat in the mask from the heating elements in the machine and there is only an easily rupturable live contact between the mask and the coating material as indicated in FIG. 15. Shortly after the vamp is removed from the machine, the coating material 240 cools sufficiently to rigidify and form a box toe on the vamp.

Figure 16:
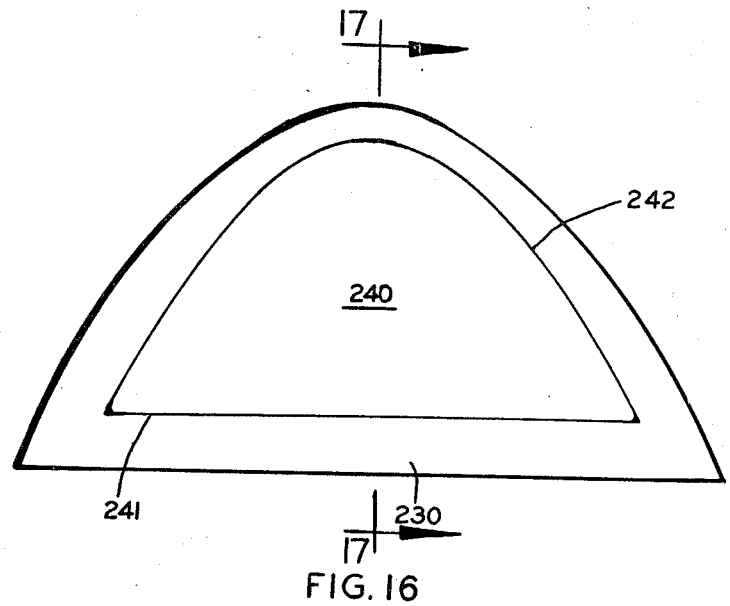
FIG. 16 is a view of the vamp after it has been coated with the box toe.
Figure 17:
FIG. 17 is a view taken on the line 17—17 of FIG. 16.

As indicated in FIGS. 16 and 17, the solidified box toe 240 has a straight rear edge 241 formed at the line 238 where the edge 122 of the applicator 114 initially engaged the support 44 and an edge 242 that converges forwardly from the opposite ends of the edge 241. The thickness of the box toe 240 gradually increases from a minimum at the edges 241 and 242 to a maximum in the center of the box toe to give the desired feathered edges. This gradual increase in thickness is caused by the cooperative relationship of the vamp 230 with the bevel 67 of the mask 56, the flexible support 44 and the applicator 114 as described above and illustrated in FIGS. 14 and 15.

The maximum thickness of the box toe 240 may be adjusted by manipulating the screw 40 to thereby adjust the vertical position of the plate 42 in the cavity 26. The cross-sectional contour of the box toe may be adjusted by manipulating the screw 20 to thereby adjust the position of the support 44 with respect to the plate 42.

I claim:

1. A method of coating a portion of a shoe part with a stiffener having a predetermined contour comprising: supporting the shoe part on a support, formed with a concavity in its upper surface, made of a flexible, deformable material; overlying the shoe part with a mask having a gap whose periphery has a contour that corresponds to the contour of at least a part of the stiffener contour; applying an applicator with a downwardly directed force against the mask in the vicinity of the gap; so moving the applicator across the mask and gap with the applicator straddling the gap, while said downwardly directed force is maintained, that the segments of the mask bounding the gap that are engaged by the applicator during its movement are progressively forced downwardly against the support to thereby cause the segments of the shoe part located immediately inward of the gap periphery to bulge upwardly of the mask bottom; and so depositing coating material in a fluent condition on the shoe part in the gap in position to be intersected by the applicator during its movement across the mask that the applicator scrapes the coating material onto the shoe part within the gap to a thickness determined by the distance between the bottom of the applicator and the top of the shoe part overlying the concavity.

2. The method as defined in claim 1 wherein the downwardly directed force is a yieldable force.

3. The method as defined in claim 1 wherein the periphery of the mask bounding the gap is formed into an inwardly and upwardly inclined bevel.

4. The method as defined in claim 1 wherein the coating material is progressively deposited just before the applicator during the movement of the applicator.

5. A method of coating a portion of a shoe part with a stiffener having a predetermined contour comprising: supporting the shoe part on a support, formed with a concavity in its upper surface, made of a flexible, deformable material; overlying the shoe part with a mask having a pair of spaced flanges that define a gap therebetween whose periphery has a contour corresponding to the contour of the stiffener; applying an applicator with a downwardly directed force against the mask flanges so that the applicator straddles the gap; so moving the applicator across the mask and gap, with the applicator straddling the gap, while said downwardly directed force is maintained, that the segments of the mask bounding the gap that are engaged by the applicator during its movement are progressively forced downwardly against the support to thereby cause the segments of the shoe part immediately inward of the gap periphery to bulge upwardly of the mask bottom; and so depositing coating material in a fluent condition on the shoe part in the gap in position to be intersected by the applicator during its movement across the mask that the applicator scrapes the coating material onto the shoe part within the gap to a thickness determined by the distance between the bottom of the applicator and the top of the shoe part overlying the concavity.

6. The method as defined in claim 5 wherein the downwardly directed force is a yieldable force.

7. The method as defined in claim 5 wherein the periphery of the mask bounding the gap is formed into an inwardly and upwardly inclined bevel.

8. The method as defined in claim 5 wherein the coating material is progressively deposited just before the applicator during the movement of the applicator.

9. A method of coating a portion of a shoe part with a stiffener having a predetermined contour comprising: supporting the shoe part on a support having a concavity in its upper surface; overlying the shoe part with a mask having a gap whose periphery has a contour that corresponds to the contour of at least a part of the stiffener contour and with the gap above the concavity; applying an applicator with a downwardly directed force against the mask in the vicinity of the gap; moving the applicator across the mask and gap, with the applicator straddling the gap, while said downwardly directed force is maintained; and progressively depositing coating material in a fluent condition on the shoe part in the gap just before the applicator during the movement of the applicator; whereby the applicator scrapes the coating material onto the shoe part within the gap to a thickness determined by the distance between the bottom of the applicator and the top of the shoe part and the pressure of the depositation of the fluent material causes the shoe part to be forced against the concavity.

10. The method as defined in claim 9 wherein the downwardly directed force is a yieldable force.

11. The method as defined in claim 9 wherein the support is made of a flexible deformable material so that the segments of the mask bounding the gap that are engaged by the applicator during its movement are progressively forced downwardly against the support to thereby cause the segments of the shoe part located immediately inward of the gap periphery to bulge upwardly of the mask bottom.

12. The method as defined in claim 11 wherein the periphery of the mask bounding the gap is formed into an inwardly and upwardly inclined bevel.

13. A method of coating a portion of a shoe part with a stiffener having a predetermined contour comprising: supporting the shoe part on a support having a concavity in its upper surface; overlying the shoe part with a mask having a pair of spaced flanges that define a gap therebetween whose periphery has a contour corresponding to the contour of the stiffener and with the gap above the concavity; applying an applicator with a downwardly directed force against the mask flanges so that the applicator straddles the gap; moving the applicator across the mask and gap, with the applicator straddling the gap, while said downwardly directed force is maintained; and progressively depositing coating material in a fluent condition on the shoe part in the gap just before the applicator during the movement of the applicator; whereby the applicator scrapes the coating material onto the shoe part within the gap to a thickness determined by the distance between the bottom of the applicator and the top of the shoe part and the pressure of the depositation of the fluent material causes the shoe part to be forced against the concavity.

14. The method as defined in claim 13 wherein the downwardly directed force is a yieldable force.

15. The method of claim 13 wherein the support is made of a flexible deformable material so that the segments of the mask bounding the gap that are engaged by the applicator during its movement are progressively forced downwardly against the support to thereby cause the segments of the shoe part located immediately inward of the gap periphery to bulge upwardly of the mask bottom.

16. The method defined in claim 15 wherein the periphery of the mask bounding the gap is formed into an inwardly and upwardly inclined bevel.

17. An apparatus for coating a portion of a shoe part with a stiffener having a predetermined contour comprising: a support, adapted to support the shoe part, formed with a concavity in its upper surface and made of a flexible, deformable material; a mask, overlying the support and adapted to hold the shoe part against the support, having a gap overlying the concavity whose periphery has a contour corresponding to the contour of at least a part of the stiffener contour; an applicator; means for applying the applicator against the mask in the vicinity of the gap with a downwardly directed force; means for so moving the applicator rearwardly across the mask and gap with the applicator straddling the gap while said downwardly directed force is maintained that the segments of the mask bounding the gap that are engaged by the applicator during its movement are progressively forced downwardly against the support to thereby cause the segments of the shoe part located immediately inward of the gap periphery to bulge upwardly of the mask bottom; and means for so depositing coating material in a fluent condition on the shoe part in the gap in position to be intersected by the applicator during its movement across the mask that the applicator scrapes the coating material onto the shoe part within the gap to a thickness determined by the distance between the bottom of the applicator and the top of the shoe part overlying the concavity.

18. The apparatus as defined in claim 17 wherein the means for applying the downwardly directed force comprises a yieldable force applying means.

19. The apparatus as defined in claim 17 further comprising: a table; a cavity in the top of the table; and means for applying a suction force to the cavity; and wherein: the support is secured to the table and overlies the cavity; whereby the concavity in the support is formed by the suction force forcing the support portion overlying the cavity into the cavity.

20. The apparatus as defined in claim 19 further comprising: a plate located in the cavity having a top that is at a lower level than the top of the table; whereby the suction force forces the support portion overlying the cavity against the table.

21. The apparatus as defined in claim 20 further comprising: means for adjusting the heightwise position of the plate in the cavity to thereby adjust the shape of the concavity.

22. The apparatus as defined in claim 17 wherein the periphery of the mask bounding the gap is formed with an inwardly and upwardly inclined bevel.

23. The apparatus as defined in claim 17 wherein the means for depositing the coating material is so constructed and arranged as to progressively deposit the coating material just before the applicator during the movement of the applicator.

24. The apparatus as defined in claim 23 wherein the applicator comprises: a body; a downwardly directed edge on the body adapted to scrape the coating material during its movement; and a space in the bottom of the body juxtaposed to the rear of the edge; and the means for depositing the coating material comprises: means for causing the coating material to flow through the space during the rearward movement of the applicator.

25. An apparatus for coating a portion of a shoe part with a stiffener having a predetermined contour comprising: a support, adapted to support the shoe part, formed with a concavity in its upper surface and made of a flexible, deformable material; a mask, overlying the support and adapted to hold the shoe part against the support, having a pair of spaced flanges that define a gap therebetween overlying the concavity whose periphery has a contour corresponding to the contour of the stiffener; an applicator; means for applying the applicator against the mask flanges so that the applicator straddles the gap with a downwardly directed force; means for so moving the applicator rearwardly across the mask and gap with the applicator straddling the gap while said downwardly directed force is maintained that the segments of the mask bounding the gap that are engaged by the applicator during its movement are progressively forced downwardly against the support to thereby cause the segments of the shoe part located immediately inward of the gap periphery to bulge upwardly of the mask bottom; and means so depositing coating material in a fluent condition on the shoe part in the gap in position to be intersected by the applicator during its movement across the mask that the applicator scrapes the coating material onto the shoe part within the gap to a thickness determined by the distance between the bottom of the applicator and the top of the shoe part overlying the concavity.

26. The apparatus as defined in claim 25 wherein the means for applying the downwardly directed force comprises a yieldable force applying means.

27. The apparatus as defined in claim 25 further comprising: a table; a cavity in the top of the table; and means for applying a suction force to the cavity; and wherein: the support is secured to the table and overlies the cavity; whereby the concavity in the support is formed by the suction force forcing the support portion overlying the cavity into the cavity.

28. The apparatus as defined in claim 27 further comprising: a plate located in the cavity having a top that is at a lower level than the top of the table; whereby the suction force forces the support portion overlying the cavity against the table.

29. The apparatus as defined in claim 28 further comprising: means for adjusting the heightwise position of the plate in the cavity to thereby adjust the shape of the concavity.

30. The apparatus as defined in claim 25 wherein the periphery of the mask bounding the gap is formed with an inwardly and upwardly inclined bevel.

31. The apparatus as defined in claim 25 wherein the means for depositing the coating material is so constructed and arranged as to progressively deposit the coating material just before the applicator during the movement of the applicator.

32. The apparatus as defined in claim 31 wherein the applicator comprises: a body; a downwardly directed edge on the body adapted to scrape the coating material during its movement; and a space in the bottom of the body juxtaposed to the rear of the edge; and the means for depositing the coating material comprises: means for causing the coating material to flow through the space during the rearward movement of the applicator.

33. An apparatus for coating a portion of a shoe with a stiffener having a predetermined contour comprising: a support, having a concavity in its upper surface, adapted to support the shoe part; a mask, overlying the support and adapted to hold the shoe part against the support, having a gap located above the concavity whose periphery has a contour corresponding to the contour of at least part of the stiffener contour; an applicator; means for applying the applicator against the mask in the vicinity of the gap with a downwardly directed force; means for moving the applicator rearwardly across the mask and gap with the applicator straddling the gap while said downwardly directed force is maintained; and means for progressively depositing coating material in a fluent condition on the shoe part in the gap just to the rear of the applicator during the movement of the applicator; whereby the applicator scrapes the coating material onto the shoe part within the gap to a thickness determined by the distance between the bottom of the applicator and the top of the shoe part and the pressure of the depositation of the fluent material causes the shoe part to be forced against the concavity.

34. The apparatus as defined in claim 33 wherein the means for applying the downwardly directed force comprises a yieldable force applying means.

35. The apparatus as defined in claim 33 wherein the support is made of a flexible deformable material so that the segments of the mask bounding the gap that are engaged by the applicator during its movement are progressively forced downwardly against the support to thereby cause the segments of the shoe part located immediately inward of the gap periphery to bulge upwardly of the mask bottom.

36. The apparatus as defined in claim 35 wherein the periphery of the mask bounding the gap is formed into an inwardly and upwardly inclined bevel.

37. The apparatus as defined in claim 35 further comprising: a table; a cavity on the top of the table; and means for applying a suction force to the cavity and wherein: the support is secured to the table and overlies the cavity; whereby the concavity in the support is formed by the suction force forcing the support portion overlying the cavity into the cavity.

38. The apparatus as defined in claim 37, further comprising: a plate located in the cavity having a top that is at a lower level than the top of the table; whereby the suction force forces the support portion overlying the cavity against the plate.

39. The apparatus as defined in claim 38 further comprising: means for adjusting the heightwise position of the plate in the cavity to thereby adjust the shape of the concavity.

40. The apparatus as defined in claim 33 wherein the applicator comprises: a body; a downwardly directed edge on the body adapted to scrape the coating material during its movement; and a space in the bottom of the body juxtaposed to the rear of the edge; and the means for depositing the coating material comprises: means for causing the coating material to flow through the space during the rearward movement of the applicator.

41. An apparatus for coating a portion of a shoe part with a stiffener having a predetermined contour comprising: a support, having a concavity in its upper surface, adapted to support the shoe part; a mask, overlying the support and adapted to hold the shoe part against the support, having a pair of spaced flanges that define a gap therebetween, the gap being located above the concavity and the gap periphery having a contour corresponding to the contour of the stiffener; an applicator; means for applying the applicator against the mask flanges with a downwardly directed force so that the applicator straddles the gap; means for moving the applicator rearwardly across the mask and gap with the applicator straddling the gap while said downwardly directed force is maintained; and means for progressively depositing coating material in a fluent condition on the shoe part in the gap just to the rear of the applicator during the movement of the applicator; whereby the applicator scrapes the coating material onto the shoe part within the gap to a thickness determined by the distance between the bottom of the applicator and the top of the shoe part and the pressure of the deposition of the fluent material causes the shoe part to be forced against the concavity.

42. The apparatus as defined in claim 41 wherein the means for applying the downwardly directed force comprises a yieldable force applying means.

43. The apparatus as defined in claim 41 wherein the support is made of a flexible, deformable material so that the segments of the mask bounding the gap that are engaged by the applicator during its movement are progressively forced downwardly against the support to thereby cause the segments of the shoe part located immediately inward of the gap periphery to bulge upwardly of the mask bottom.

44. The apparatus as defined in claim 43 wherein the periphery of the mask bounding the gap is formed into an inwardly and upwardly inclined bevel.

45. The apparatus as defined in claim 43 further comprising: a table; a cavity in the top of the table; and means for applying a suction force to the table; and wherein: the support is secured to the table and overlies the cavity; whereby the concavity in the support is formed by the suction force forcing the support portion overlying the cavity into the cavity.

46. The apparatus as defined in claim 45 further comprising: a plate located in the cavity having a top that is at a lower level than the top of the table; whereby the suction force forces the support portion overlying the cavity against the plate.

47. The apparatus as defined in claim 46 further comprising: means for adjusting the heightwise position of the plate in the cavity to thereby adjust the shape of the concavity.

48. The apparatus as defined in claim 41 wherein the applicator comprises: a body; a downwardly directed edge on the body adapted to scrape the coating material during its movement; and a space in the bottom of the body juxtaposed to the rear of the edge; and the means for depositing the coating material comprises: means for causing the coating material to flow through the space during the rearward movement of the applicator.

49. An arrangement for supporting a shoe part while a portion of the shoe part is coated with a stiffener comprising: a table; a cavity in the table; a support made of a flexible, deformable material secured to the table and overlying the cavity; and means for applying a suction force to the cavity; whereby a concavity is formed in the upper surface of the support by the suction force drawing the support portion overlying the cavity into the cavity.

50. The apparatus as defined in claim 49 further comprising: a plate located in the cavity having a top that is at a lower level than the top of the table; whereby the suction force forces the support portion overlying the cavity against the plate.

51. The apparatus as defined in claim 50 further comprising: means for adjusting the heightwise position of the plate in the cavity to thereby adjust the shape of the concavity.

52. In an apparatus for coating a portion of a shoe part with a stiffener having a predetermined contour which comprises: a support adapted to support the shoe part; a mask, overlying the support and adapted to hold the shoe part against the support, having a gap whose periphery has a contour corresponding to the contour of at least a part of the stiffener contour; an applicator having a downwardly directed edge and a side extending forwardly and upwardly from the edge; means initially locating the applicator in a lower rear position that is rearward of the support and mask; means for causing the applicator to move forwardly and upwardly from the lower rear position to a forward position above the mask; means for thereafter lowering the applicator to apply it against the mask in the vicinity of the gap; means for thereafter moving the applicator rearwardly across the mask and gap back to its initial position with the applicator straddling the gap; and means for depositing coating material in a fluent condition on the shoe part in the gap in position to be intersected by the applicator edge during its movement across the mask; the combination therewith comprising: a scraper blade located forwardly of the initial position of the applicator; means for normally urging the scraper blade against the applicator side so as to cause the scraper blade, during the forward and upward movement of the applicator, to scrape off coating material that may have accumulated on the applicator side; means effective to move the scraper blade to a lower position out of the path of the applicator during the rearward movement of the applicator; and means for thereafter moving the scraper blade back to its normal condition.

53. The apparatus as defined in claim 52 wherein the scraper blade is mounted for movement between its normal and its lower positions and the means for urging and moving the scraper blade comprises: a rod operatively connected to the scraper blade; yieldable drive means connected to the rod and operative to urge the rod in a first direction that causes the scraper blade to be urged against the applicator side; and means for releasing the yieldable drive means and causing the rod to be moved in a second direction that moves the scraper blade to its lower position.

54. In an apparatus for coating a portion of a shoe part with a stiffener having a predetermined contour which comprises: a support adapted to support the shoe part; a mask, overlying the support and adapted to hold the shoe part against the support, having a gap whose periphery has a contour corresponding to the contour of at least a part of the stiffener contour; an applicator having a downwardly directed edge and a side extending forwardly and upwardly from the edge; means initially locating the applicator in a lower rear position that is rearward of the support and mask; means for causing the applicator to move forwardly and upwardly from the lower rear position to a forward position above the mask; means for thereafter lowering the applicator to apply it against the mask in the vicinity of the gap; means for thereafter moving the applicator rearwardly across the mask and gap back to its initial position with the applicator straddling the gap; and means for depositing coating material in a fluent condition on the shoe part in the gap in position to be intersected by the applicator edge during its movement across the mask; the combination therewith comprising: a scraper blade located forwardly of the initial position of the applicator; means mounting the scraper blade for movement between an upper position wherein the scraper blade is urged against the applicator side so as to cause the scraper blade, during the forward and upward movement of the applicator, to scrape off any coating material that may have accumulated on the applicator side and a lower position wherein the scraper blade is out of the path of the applicator during the rearward movement of the applicator; a fluid actuated motor having a cylinder member and a piston member with one of the members being movable with respect to the other member in response to the admission of fluid to the motor; means operatively connecting the movable member to the blade for movement in unison with the movable member; means for normally supplying fluid to the motor so as to urge the movable member in a first direction that causes the scraper blade to be urged to its upper position; means effective during the rearward movement of the applicator to supply fluid to the motor so as to move the movable member in a second direction that causes the scraper blade to be moved to its lower position; and means for thereafter resuming said normal supply of fluid to the motor.

References Cited

UNITED STATES PATENTS

| | | | |
|---|---|---|---|
| 2,836,852 | 6/1958 | Butzko | 264—90 |
| 3,347,966 | 10/1967 | Seefluth | 264—338 X |
| 3,277,867 | 10/1966 | Kilham et al. | 118—204 |
| 3,342,624 | 9/1967 | Kamborian | 117—38 |

RALPH S. KENDALL, Primary Examiner

U.S. Cl. X.R.

117—102, 104, 111; 118—104, 120, 203, 301